(12) United States Patent
Watabe et al.

(10) Patent No.: US 7,234,345 B2
(45) Date of Patent: Jun. 26, 2007

(54) VEHICLE TIRE AIR PRESSURE DETECTION SYSTEM AND METHOD

(75) Inventors: Nobuya Watabe, Nagoya (JP); Hideki Saito, Anjo (JP)

(73) Assignee: DENSO Corporation, Kariya, Aichi-pref. (JP)

( * ) Notice: Subject to any disclaimer, the term of this patent is extended or adjusted under 35 U.S.C. 154(b) by 0 days.

(21) Appl. No.: 11/336,813

(22) Filed: Jan. 23, 2006

(65) Prior Publication Data

US 2006/0196258 A1  Sep. 7, 2006

(30) Foreign Application Priority Data

Mar. 2, 2005  (JP) .............................. 2005-57617

(51) Int. Cl.
*B60C 23/02* (2006.01)

(52) U.S. Cl. ...................... 73/146.5; 340/445

(58) Field of Classification Search ............... 73/146.5, 73/146, 146.8; 340/445, 447
See application file for complete search history.

(56) References Cited

U.S. PATENT DOCUMENTS

| | | | |
|---|---|---|---|
| 5,686,714 A | 11/1997 | Abe et al. | |
| 5,949,047 A | 9/1999 | Abe et al. | |
| 6,486,773 B1 * | 11/2002 | Bailie et al. | 340/445 |
| 6,604,415 B2 * | 8/2003 | Imao et al. | 73/146.5 |
| 6,705,155 B2 * | 3/2004 | Katou | 73/146 |
| 6,904,796 B2 * | 6/2005 | Pacsai et al. | 73/146.8 |
| 2004/0162651 A1 * | 8/2004 | Halm et al. | 701/29 |
| 2006/0042368 A1 * | 3/2006 | Hirota | 73/146 |

FOREIGN PATENT DOCUMENTS

| | | |
|---|---|---|
| JP | 2000-059271 | 2/2000 |
| JP | 2000-255229 | 9/2000 |

* cited by examiner

*Primary Examiner*—Andre J. Allen
(74) *Attorney, Agent, or Firm*—Nixon & Vanderhye P.C.

(57) ABSTRACT

In a vehicle tire air pressure detection system, a charging electromagnetic wave is transmitted for a predetermined period from a vehicle chassis side and stored as a charge voltage in a transmitter unit attached to a tire wheel. When the charge voltage reaches a predetermined level, a sensor in the transmitter unit detects a tire air pressure and a transmitter/receiver of the transmitter unit transmits a detection data on an electromagnetic wave in the same frequency band as the charging electromagnetic wave after the predetermined period from a time point at which the charge voltage has reached the predetermined level. Thus, interference between the charging electromagnetic wave and the electromagnetic wave of the detection data is prevented.

13 Claims, 5 Drawing Sheets

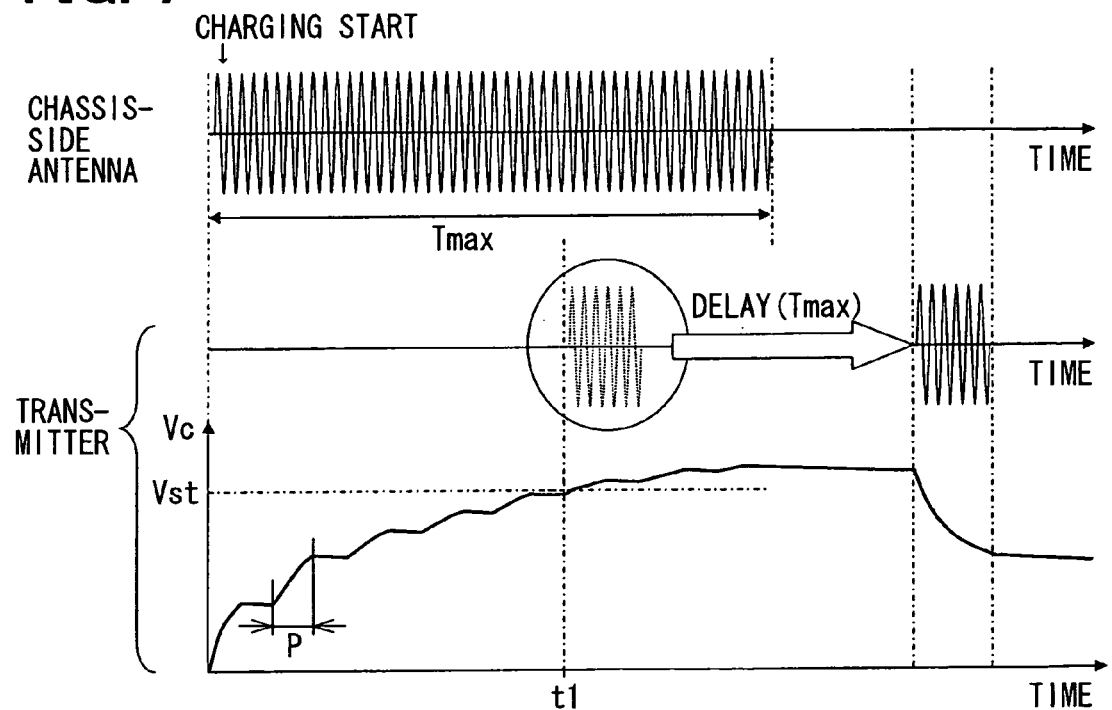
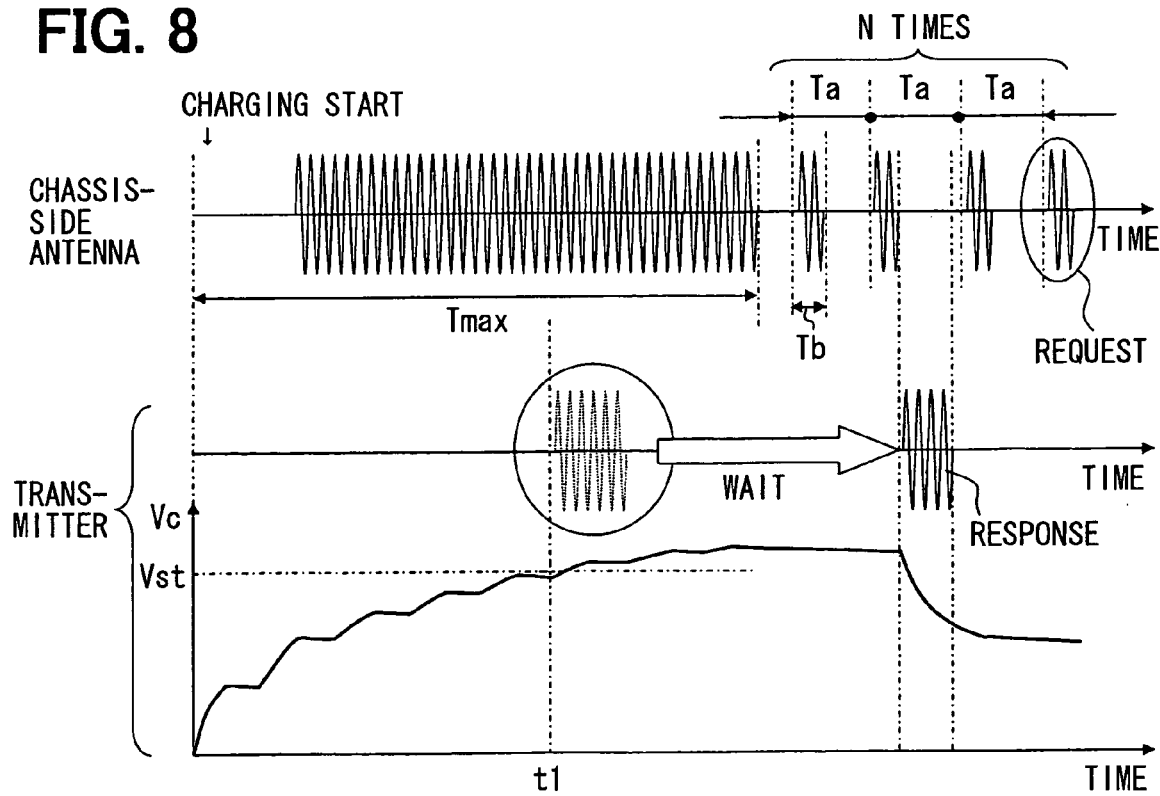

VEHICLE TIRE AIR PRESSURE DETECTION SYSTEM AND METHOD

CROSS REFERENCE TO RELATED APPLICATION

This application is based on and incorporates herein by reference Japanese patent application No. 2005-57617 filed on Mar. 2, 2005.

FIELD OF THE INVENTION

The present invention relates to a vehicle tire air pressure detection system and method, in which a transmitter attached to a vehicle wheel transmits tire air pressure data with electric power supplied in a contactless manner from a receiver attached to a vehicle chassis.

BACKGROUND OF THE INVENTION

Various vehicle tire air pressure detection systems are proposed. In JP P2000-255229A, for instance, a transmitter and an air pressure sensor are attached to a vehicle wheel and operated with electric power supplied from a vehicle chassis side in a contactless manner, that is, by electromagnetically coupling coils of the vehicle chassis side and the vehicle tire side. In this system, if the coils are electromagnetically operating to supply the electric power, it is likely that an air pressure detection data transmitted as an electromagnetic wave from the transmitter is interfered by the electromagnetic operation of the coils.

SUMMARY OF THE INVENTION

The present invention is directed to a vehicle tire air pressure detection system and method, which ensures transmission of a tire air pressure detection data from a tire wheel side to a vehicle chassis side without being interfered by a charging electromagnetic wave transmitted from the vehicle chassis side.

According to an aspect of the present invention, a charging electromagnetic wave is transmitted from a chassis side electronic unit of a vehicle toward a tire side electronic unit of the vehicle, and the charging electromagnetic wave is converted into electric power to operate the tire side electronic unit. A tire air pressure is detected by the tire side electronic unit with converted electric power, and a detection data of the tire air pressure is transmitted as a data electromagnetic wave from the tire side electronic unit to the chassis side electronic unit with the converted electric power. A transmission of the data electromagnetic wave is enabled only after a transmission of the charging electromagnetic wave has been completed. Thus, it is prevented that the data electromagnetic wave is interfered by the charging electromagnetic wave.

BRIEF DESCRIPTION OF THE DRAWINGS

The above and other objects, features and advantages of the present invention will become more apparent from the following detailed description made with reference to the accompanying drawings. In the drawings:

FIG. 7 is a signal chart illustrating an operation of the first embodiment;

FIG. 8 is a signal chart illustrating an operation of a tire air pressure detection system according to a second embodiment;

DETAILED DESCRIPTION OF THE EMBODIMENT (First Embodiment)

Figure 1:
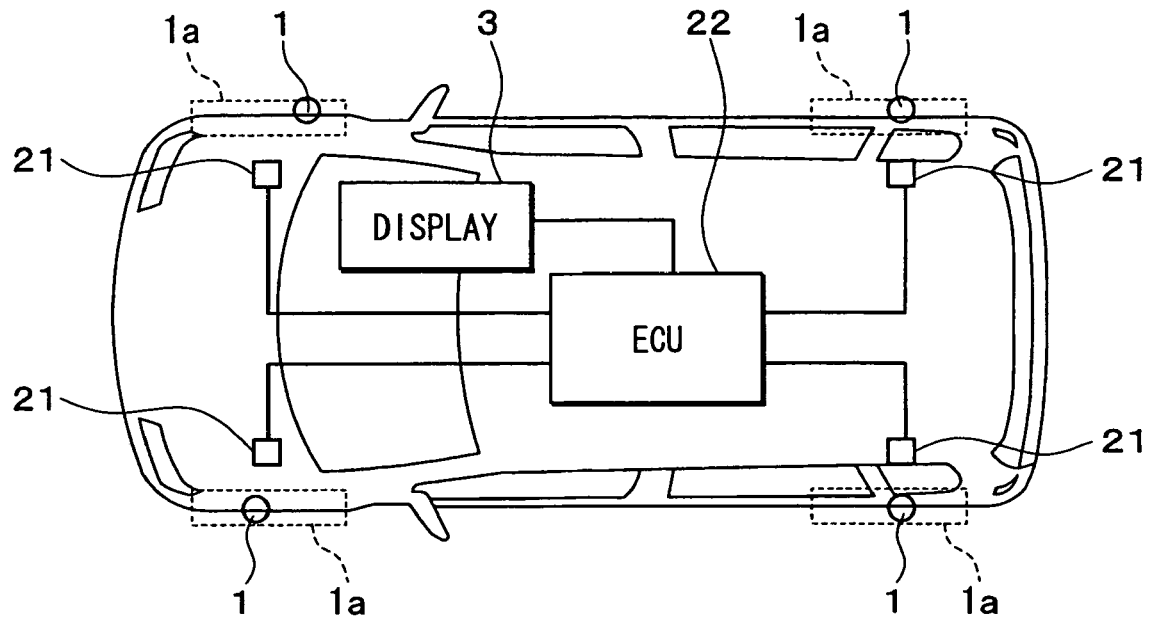
FIG. 1 is a schematic diagram of a tire air pressure detection system according to a first embodiment of the present invention.

Referring first to FIG. 1, a vehicle tire air pressure detection system is constructed with a sensor-transmitter (transmitter) 1 as a tire side electronic unit, a chassis-side antenna 21, an electronic control unit (ECU) 22 and a display 3. The antenna 21 and the ECU 22 jointly form a receiver unit 2 as a chassis side electronic unit. The transmitter unit 1 is attached to each tire wheel 1a to detect an air pressure of the tire and transmit the detected air pressure data. The antenna 21 is attached to a vehicle chassis for each transmitter unit 1. The antenna 21 charges the transmitter unit 1 with electric power and receives the data transmitted from the transmitter unit 1, so that the ECU 22 calculates tire air pressure of each tire based on the received data.

Figure 2:
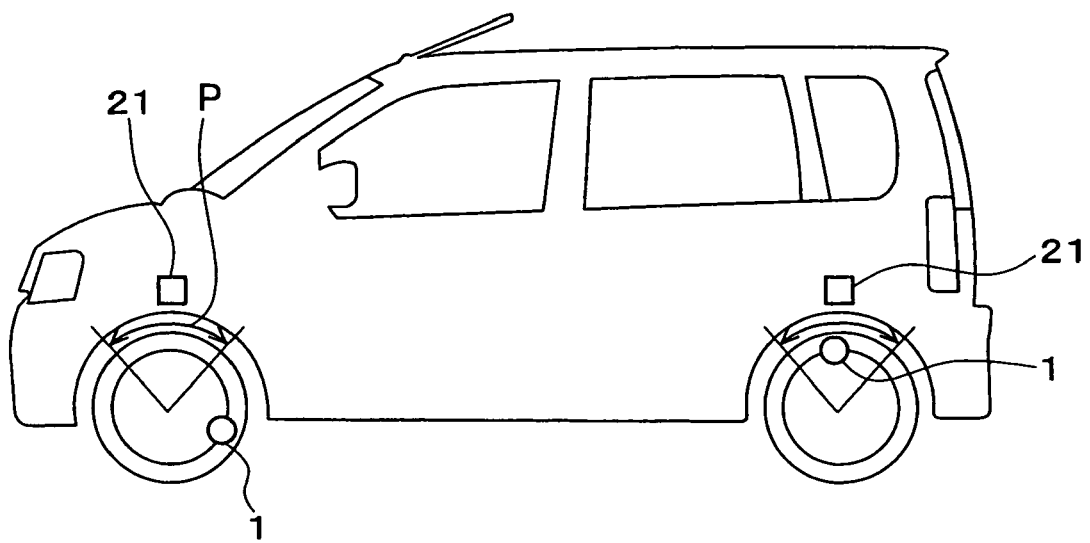
FIG. 2 is a schematic side view illustrating locations of a transmitter and a chassis-side antenna in the first embodiment.

As illustrated in FIG. 2, each antenna 21 is located near the tire wheel 1a to which the corresponding transmitter unit 1 is attached. As a result, the transmitter unit 1 and the receiver unit 2 are capable of radio communications as long as the rotational position of the transmitter unit 1 is within a predetermined angular range P. This range P is defined as an area, which enables the antenna 21 to charge electric power in the transmitter unit 1.

Figure 3:
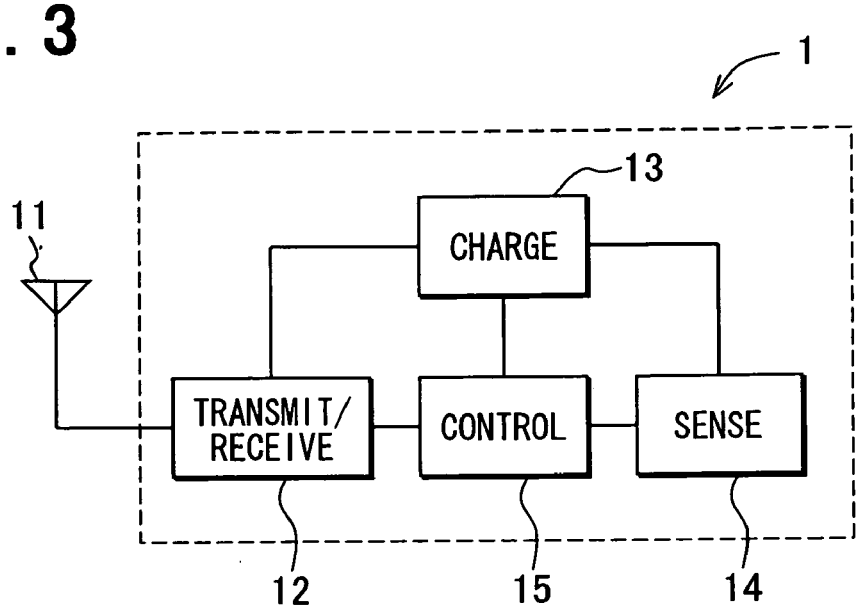
FIG. 3 is a block diagram illustrating a transmitter in the first embodiment.

The transmitter unit 1 is constructed to be electrically charged by charging the electromagnetic wave transmitted from the antenna 21 to operate with the charged electric power. Specifically, as illustrated in FIG. 3, the transmitter unit 1 is constructed with an antenna 11, a transmitter/receiver 12, a charger 13, a pressure sensor 14 and an electronic controller 15. When the charging electromagnetic wave transmitted from the antenna 21 is received through the antenna 11 and the transmitter/receiver 12, the charger 13 converts the charging electromagnetic wave to electric power energy and stores the energy therein. With this stored energy, the transmitter unit 1 is capable of operating.

The transmitter/receiver 12 is constructed to include a L-C resonance circuit and the like to not only receive the charging electromagnetic wave but also transmit the data of tire air pressure detected by the sensor 14. This data is transmitted as a data electromagnetic wave in the same frequency band (for instance 125 KHz) as the charging electromagnetic wave.

The charger 13 supplies electric power to the sensor 14 and the controller 15. The charger 13 may be constructed with a diode, a capacitor and the like. When the capacitor is charged to a predetermined voltage (for instance 5 V)

required to maintain the sensor 14 and controller 15 operable, a switch is turned on to supply the charge voltage of the capacitor to the sensor 14 and the controller 15.

The sensor 14 may be a diaphragm type pressure sensor and produce a detection signal corresponding to the detected tire air pressure. Specifically, the sensor 14 is exposed inside the tire by attaching the transmitter unit 1 to the air injection valve of the tire wheel 1a.

The controller 15 may be constructed with a microcomputer including a CPU, ROM, RAM, I/O and the like, so that the CPU executes predetermined processing programmed in the ROM. The controller 15 processes the detection signal of the sensor 14 to a digital data and stores it in a transmission frame to be transmitted from the transmitter/receiver 12 when requested. In case tire air temperature is also to be detected, the sensor 14 may include a temperature sensing element and data of detected air temperature may be transmitted together with the detected pressure data in the transmission frame.

Figure 4:
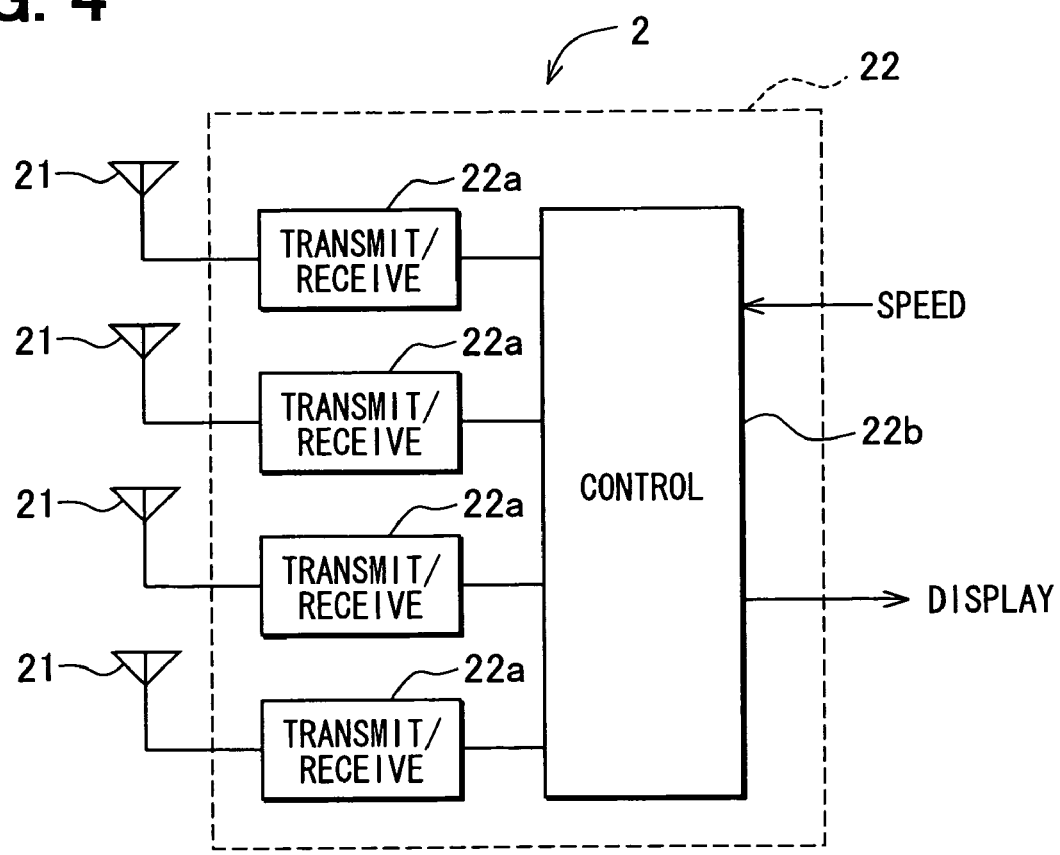
FIG. 4 is a block diagram illustrating a chassis-side antenna and an ECU of a receiver in the first embodiment.

As illustrated in FIG. 4, the ECU 22 is constructed with transmitter/receivers 22a and an electronic controller 22b. Each transmitter/receiver 2a is connected to the corresponding one of the antennas 21, which are provided in correspondence with the respective transmitters 1. The controller 22b may be a microcomputer including a CPU, ROM, RAM, I/O and the like, so that the CPU executes predetermined processing programmed in the ROM.

Specifically, the controller 22b periodically drives the transmitter/receivers 22a to transmit from the respective antennas 21 the charging electromagnetic wave for the transmitters 1. This electromagnetic wave transmission may be controlled based on a vehicle travel speed SPD. Further, the controller 22b receives the pressure detection data transmitted from each transmitter unit 1 and determines the tire air pressure of each tire by specifying which tire the data belongs to based on the location of the antenna and the time of electric charging. When the controller 22b determines that the tire air pressure is less than a predetermined threshold level, it drives the display 3 to indicate a decrease of tire air pressure.

The display 3 may be located in a vehicle, for instance in an instrument panel, so that a driver may recognize the indicated decrease of the tire air pressure with ease.

Figure 5:
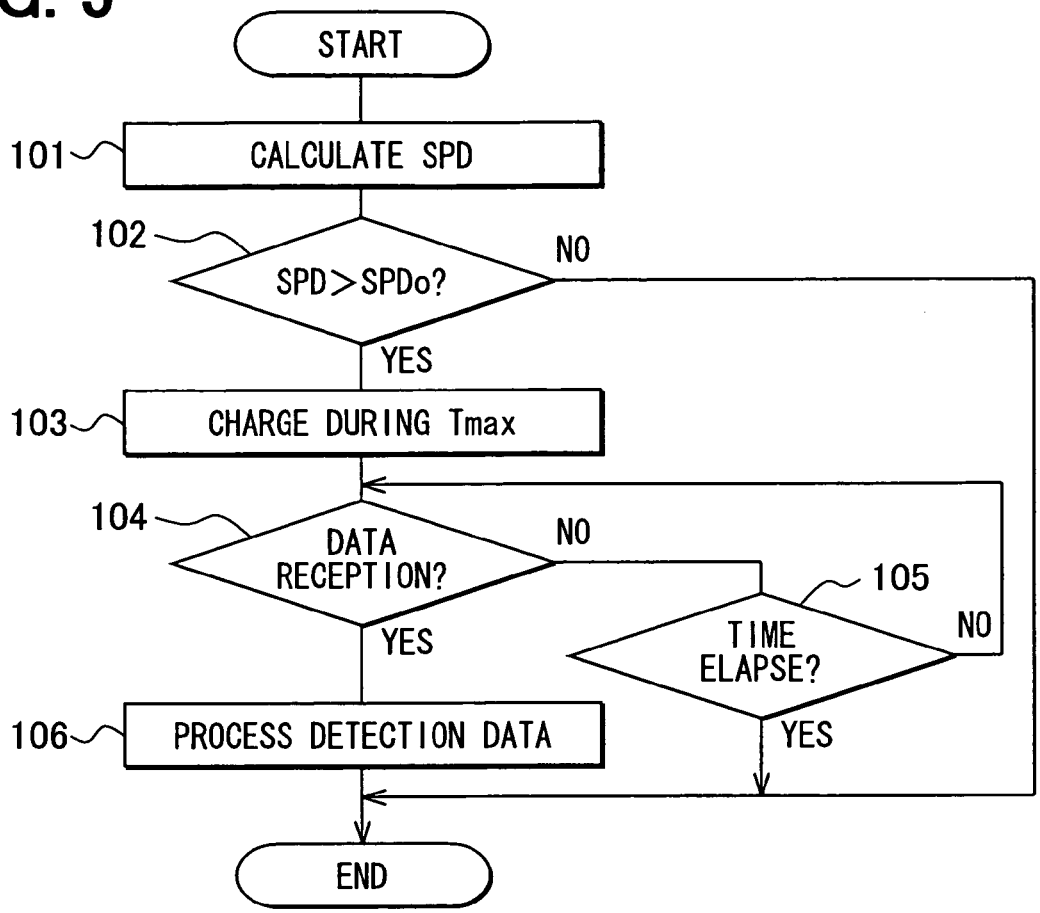
FIG. 5 is a flowchart illustrating processing of the receiver in the first embodiment.

In operation, the controller 22b of ECU 22 executes the processing illustrated in FIG. 5 periodically, for instance at every minute, after electric power is supplied from a vehicle-mounted battery (not shown) through a key switch in the vehicle.

In the processing of FIG. 5, a vehicle speed SPD is calculated at step 101 based on a speed signal applied from a speed sensor (not shown). Then this speed SPD is compared with a threshold speed SPDo (about zero) at step 102 to determine whether the vehicle is traveling or at rest. If the vehicle is at rest (NO) in which the charging electromagnetic wave may not be received by the transmitter unit 1, no more processing is executed. In this case, inhibition of unnecessary transmission of the charging electromagnetic wave is effective to not only save electric power of the battery but also reduce electromagnetic interference on various electronic devices of other nearby vehicles.

If the vehicle is traveling (YES), each transmitter/receiver 2a is driven to transmit the charging electromagnetic wave through respective antennas 21 during a predetermined charging period Tmax at step 103. A period of charging required to charge the transmitter unit 1 depends on vehicle factors (tire size, suspension height, wheel shape, etc.), surrounding circumstance factors (ambient temperature, road surface, weather, etc.) and circuit factors (electromagnetic wave power, antenna gain, sensor current, etc.). Therefore, the charging period Tmax is determined to a period (for instance 1 second), which is a required minimum for charging in the possible worst situation and allows a number of rotations of the tire wheel.

After step 103, it is checked at step 104 whether detection data of tire air pressure has been received from any one of the transmitters 1. If no data has been received (NO), it is checked at step 105 whether a predetermined period T for data reception, which may also be Tmax, has elapsed after completion of charging. If not (NO), steps 104 and 105 are repeated until the charging period Tmax elapses. If the charging period has elapsed (YES), one cycle of this routine ends.

If the detection data of air pressure has been received (YES) from any one of the transmitters 1, this data is subjected to detection data processing of calculating the tire air pressure at step 106. If the calculated tire air pressure is less than the predetermined threshold, the display 3 is driven at step 106 to indicate the decrease of the tire air pressure. This receiving processing is executed for each transmission of data from the transmitters 1. After all the data are received and processed at step 106, one cycle of this routine ends.

If the charging electromagnetic wave is transmitted from each antenna 21, each transmitter/receiver 12 receives it through the corresponding antenna 21 while rotating in the predetermined angular zone P. As a result, the charge voltage Vc of the charger 13 increases gradually as illustrated in FIG. 7 during the charging period Tmax. When the charge voltage Vc reaches a predetermined driving start voltage Vst at time t1, the charge voltage Vc is supplied to the sensor 14 and the controller 15, which responsively start to operate.

Figure 6:
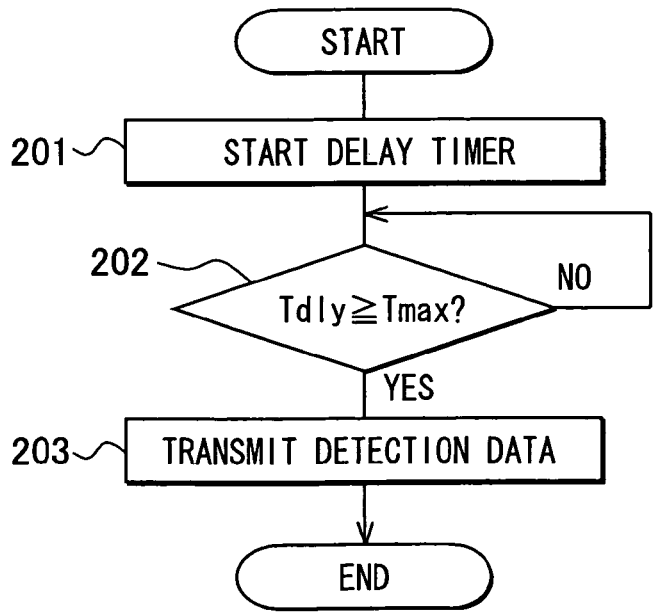
FIG. 6 is a flowchart illustrating processing of the transmitter in the first embodiment.

When the controller 15 thus operates with the charge voltage Vc, a data transmission delay timer is started at step 201 in FIG. 6 to count time. Then it is determined at step 202 whether the counted time Tdly reaches the charging period Tmax. If the counted time Tdly is less than the charging period Tmax (NO), the controller 15 only continues to count time. Therefore, the controller 15 operates in the low power consumption mode. If the counted time Tdly reaches the charging period Tmax (YES), the detection data of the tire air pressure detected by the sensor 14 is transmitted from the transmitter/receiver 12 and the antenna 11 at step 203.

Thus, since the controller 15 delays the transmission of the detection data by the charging period Tmax after starting its operation at time t1, that is, the detection data is temporarily held, the electromagnetic wave of detection data of the transmitter unit 1 is not interfered with the charging electromagnetic wave of the receiver unit 2.

(Second Embodiment)

In this embodiment, as illustrated in FIG. 8, after transmitting the charging electromagnetic wave from the antenna 21 for the period Tmax, a response request signal comprising a command of several bits is transmitted from the receiver unit 2 through the antenna 21 during a transmission period Tb a plurality of times (for instance N times) at every predetermined interval Ta. The controller 15 in the transmitter unit 1 starts to transmit the detection data in response to the response request signal after waiting for a time from time t1.

It is noted that the transmitter unit 1 is capable of receiving signals from the receiver unit 2 only while rotating in the angular range P. Therefore, the transmitter unit 1 must be in the range P at least once among the plurality of times (N) of transmission of the request signals. For this reason, the number of times N is determined as N≧360°/P. If P is 90°, N is determined to be at least 4.

The time interval Ta between two successive request signals is determined as Ta=f(SPD)/N+m·f(SPD) assuming that the vehicle speed is SPD (km/h). Here, f(SPD) is a time period in which a tire makes one rotation at the speed SPD, and hence f(SPD)/N is a time period required for the transmitter unit 1 to rotate a signal receiving area (angular range P) in which the transmitter unit 1 is capable of receiving the request signal. Further, m·f(SPD) is an additional period provided so that the interval Ta is made longer than the request signal transmission period Tb. Here, m is set to be larger than Tb/f(SPD).

With the above settings, the request signal can be transmitted at the time point shifted by a period required to pass the request signal receiving range. Thus, the transmitter unit 1 is enabled to receive at least one of request signals transmitted N times at every interval of Ta.

Figure 9:
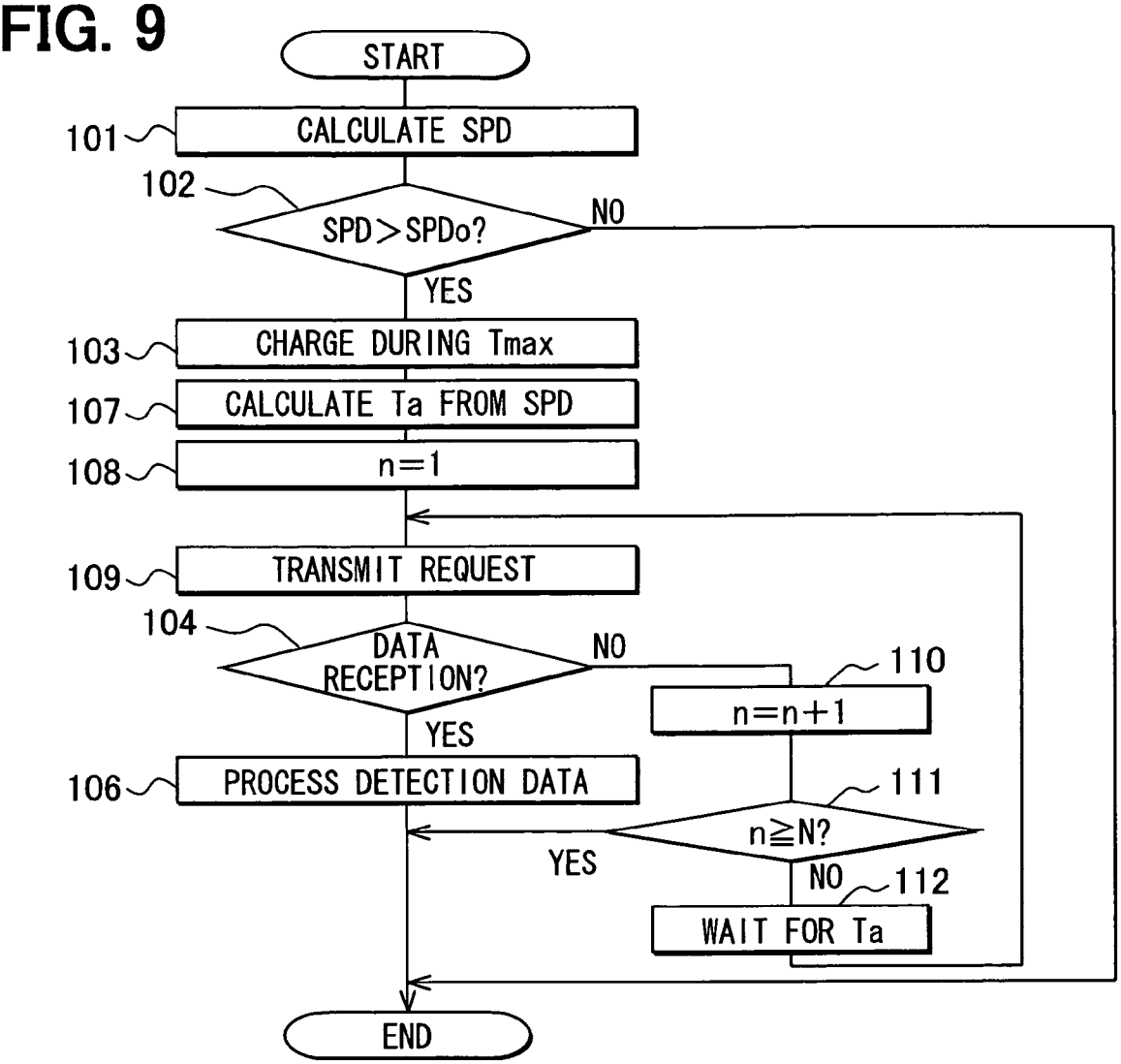
FIG. 9 is a flowchart illustrating processing of a receiver in the second embodiment.

For the above operation, the controller 22b of the receiver unit 2 operates as illustrated in FIG. 9, in which steps 101 to 103, 104 and 106 are the same as the first embodiment (FIG. 5).

Specifically, after step 103, the interval Ta is calculated from the vehicle speed SPD at step 107 and the number of times (n) of transmissions is set to n=1 at step 108. Then at step 109, the request signal is transmitted within a short period Tb at step 109 by modulating a predetermined code of a few bits. If no detection data is received (NO at step 104) from any transmitters 1, the number n is incremented at step 110. It is then determined at step 111 whether the number has reached the predetermined number N. If not (NO), the processing waits for the period Ta after the transmission of the request signal at step 112. After waiting for the period Ta, the request signal is transmitted again at step 109. This transmission of the request signal is repeated until the number n reaches N (YES at step 111), thus ending one cycle of the above processing.

If the detection data is received from any one of the transmitters 1 (YES at step 104), the detection data is processed at step 106 in the similar manner as in the first embodiment. When all the detection data are processed at step 106, one cycle of this routine ends.

Figure 10:
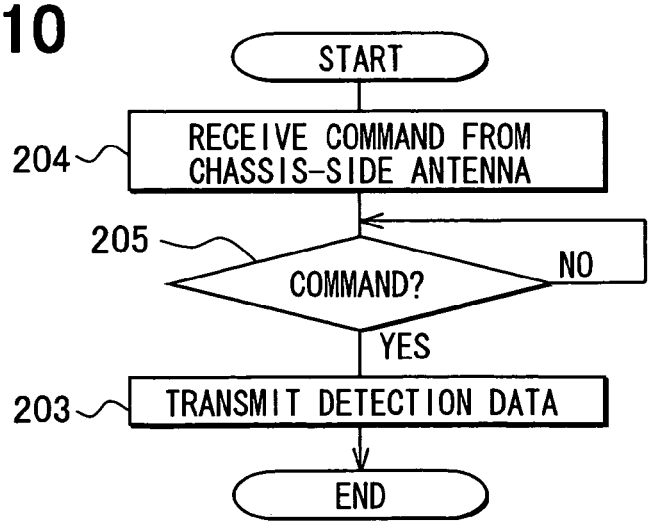
FIG. 10 is a flowchart illustrating processing of a transmitter in the second embodiment.

In the transmitter unit 1, when the charge voltage Vc rises to the drive start voltage Vst, the controller 15 starts to operate to execute the processing of FIG. 10. Specifically, the request signal (data transmission command) from the antenna 21 is received at step 204. If it is received (YES), the detection data is transmitted from the transmitter/receiver 12 and antenna 11 at step 203.

In the second embodiment, the receiver unit 2 transmits the request signals N times at every interval Ta after transmitting the charging electromagnetic wave. The transmitter unit 1 transmits the detection data in response to the request signals, respectively. Therefore, it does not arise that the electromagnetic wave of the detection data is interfered by the charging electromagnetic wave.

(Modifications)

In the first embodiment, the detection data from the transmitter unit 1 need not be transmitted immediately after an elapse of the time period Tmax after the time point t1 but may be transmitted after another time delay from an elapse of the time period Tmax. The time period Tmax need not be fixed but may be variable. Further, the detection data may be transmitted by confirming by the controller 15 that the transmitter/receiver 12 does not receive the charging electromagnetic wave any more.

In the above embodiments, processing of steps 101 and 102 may be eliminated so that the charging electromagnetic wave may be transmitted irrespective of travel of the vehicle, that is, irrespective of rotation of the tire wheels. Further, the antennas 21 need not be provided in correspondence with the transmitters 1 in number but may be replaced with a single antenna to be shared.

Still other modifications are possible without departing from the spirit of the present invention.

What is claimed is:

1. A vehicle tire air pressure detection system comprising:
   a transmitter unit attached to a wheel having a tire, wherein the transmitter includes
      a first transmitter/receiver for receiving a first electromagnetic wave for electric charging and for transmitting data with a second electromagnetic wave,
      a charger for charging electric power therein with the first electromagnetic wave,
      a sensor for detecting air pressure of the tire, and
      a first controller operated with the electric power for driving the first transmitter/receiver to transmit detection data of the air pressure of the tire with the second electromagnetic wave in a same frequency band as the first electromagnetic wave;
   a receiver unit attached to a chassis of the vehicle, wherein the receiver unit includes
      an antenna,
      a second transmitter/receiver for transmitting the first electromagnetic wave from the antenna toward the first transmitter/receiver and receiving the detection data through the antenna, and
      a second controller for driving the second transmitter/receiver to transmit the first electromagnetic wave and determining air pressure of the tire based on the detection data,
   wherein the second controller includes means for driving the second transmitter/receiver to transmit the first electromagnetic wave for a predetermined period, and
   wherein the first controller drives the first transmitter/receiver to transmit the detection data after an elapse of the predetermined period from being made operable with the electric power of the charger.

2. The vehicle tire air pressure detection system as in claim 1, wherein:
   the first controller includes means for checking the elapse of the predetermined period, and
   the second controller drives the second transmitter/receiver to transmit the first electromagnetic wave only when a travel speed of the vehicle is higher than a predetermined speed.

3. A vehicle tire air pressure detection system comprising:
   a transmitter unit attached to a wheel having a tire, wherein the transmitter includes
      a first transmitter/receiver for receiving a first electromagnetic wave for electric charging and for transmitting data with a second electromagnetic wave,
      a charger for charging electric power therein with the first electromagnetic wave,
      a sensor for detecting air pressure of the tire, and
      a first controller operated with the electric power for driving the first transmitter/receiver to transmit detection data of the air pressure of the tire with the second electromagnetic wave in a same frequency band as the first electromagnetic wave;
   a receiver unit attached to a chassis of the vehicle, wherein the receiver unit includes
      an antenna, a second transmitter/receiver for transmitting the first electromagnetic wave from the antenna toward the first transmitter/receiver and receiving the detection data through the antenna, and a second controller for driving the second transmitter/receiver to transmit the first electromagnetic wave and determining air pressure of the tire based on the detection data, wherein the second controller includes means for driving the second transmitter/receiver to transmit the first electromagnetic wave for a predetermined period and transmit a response request signal after the predetermined period, and wherein the first controller includes means for checking a reception of the response request signal from being made operable with the electric power of the charger and drives the first transmitter/receiver to transmit the detection data after the reception of the response request signal.

4. The vehicle tire air pressure detection system as in claim 3, wherein the second transmitter/receiver is driven to transmit the response request signal a predetermined number of times.

5. The vehicle tire air pressure detection system as in claim 4, wherein the second transmitter/receiver is driven to transmit the response request signal at every predetermined interval corresponding to a time period required for the transmitter to pass an angular range in which the transmitter is capable of receiving the response request signal.

6. The vehicle tire air pressure detection system as in claim 3, wherein the second controller includes means for checking whether a vehicle is traveling at a travel speed higher than a predetermined speed and drives the second transmitter/receiver to transmit the first electromagnetic wave only when the travel speed is higher than the predetermined speed.

7. A tire air pressure detection method for a vehicle comprising:

transmitting a charging electromagnetic wave from a chassis side electronic unit of the vehicle toward a tire side electronic unit of the vehicle;

converting the charging electromagnetic wave into electric power to operate the tire side electronic unit;

detecting a tire air pressure by the tire side electronic unit with converted electric power; and transmitting a detection data of the tire air pressure as a data electromagnetic wave from the tire side electronic unit to the chassis side electronic unit with the converted electric power, wherein a transmission of the data electromagnetic wave is enabled only after a transmission of the charging electromagnetic wave has been completed.

8. The tire air pressure detection method as in claim 7, further comprising:

detecting a time point at which the converted electric power reaches a predetermined level, wherein the transmission of the data electromagnetic wave is attained only after a predetermined period from a detection of the time point.

9. The tire air pressure detection method as in claim 8, wherein a transmission of the charging electromagnetic wave is continued for the predetermined period.

10. The tire air pressure detection method as in claim 8, wherein:

the charging electromagnetic wave is transmitted only when the vehicle is traveling; and the predetermined period is set to correspond to more than a plurality of rotations of the tire.

11. The tire air pressure detection method as in claim 7, further comprising:

transmitting a request electromagnetic wave after the charging electromagnetic wave has been transmitted for a predetermined period, wherein the data electromagnetic wave is transmitted only in response to the request electromagnetic wave.

12. The tire air pressure detection method as in claim 11, wherein:

the response electromagnetic wave has a period shorter than the predetermined period of the transmission of the charging electromagnetic wave; and the response electromagnetic wave is transmitted at every predetermined interval a plurality of times.

13. The tire air pressure detection method as in claim 12, wherein the predetermined interval is determined based on a travel speed of the vehicle.

* * * * *